United States Patent
Jiang et al.

(10) Patent No.: US 9,756,657 B2
(45) Date of Patent: Sep. 5, 2017

(54) WIRELESS NETWORK SIGNAL TO INTERFERENCE PLUS NOISE RATIO ESTIMATION FOR A RANDOM ACCESS CHANNEL

(71) Applicant: TEXAS INSTRUMENTS INCORPORATED, Dallas, TX (US)

(72) Inventors: Jing Jiang, Wellesley, MA (US); Mingjian Yan, Gaithersburg, MD (US); Aleksandar Purkovic, Potomac, MD (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/335,546

(22) Filed: Jul. 18, 2014

(65) Prior Publication Data
US 2015/0023329 A1    Jan. 22, 2015

Related U.S. Application Data

(60) Provisional application No. 61/857,112, filed on Jul. 22, 2013.

(51) Int. Cl.
*H04W 74/00* (2009.01)
*H04B 17/345* (2015.01)
(Continued)

(52) U.S. Cl.
CPC ........ *H04W 74/008* (2013.01); *H04B 17/345* (2015.01); *H04J 11/0036* (2013.01);
(Continued)

(58) Field of Classification Search
None
See application file for complete search history.

(56) References Cited

U.S. PATENT DOCUMENTS 7,489,901 B2 * 2/2009 Gandhi ................ H04W 48/06
455/226.2
8,064,546 B2 11/2011 Jiang et al.
(Continued)

FOREIGN PATENT DOCUMENTS

| WO | 2008057584 | 5/2008 |
|---|---|---|
| WO | 2009109854 | 9/2009 |
| WO | 2011022404 | 2/2011 |

*Primary Examiner* — Peter Chau
(74) *Attorney, Agent, or Firm* — Ronald O. Neerings; Charles A. Brill; Frank D. Cimino

(57) ABSTRACT

A wireless device includes a preamble detector configured to identify a plurality of preambles transmitted via a random access channel of a wireless network. The preamble detector includes a noise floor estimator. The noise floor estimator is configured to: estimate, for a given preamble root sequence identified by the preamble detector, a noise floor value as mean energy of received signal samples, excluding detected preamble samples on the give preamble root sequence, below a noise floor threshold assigned to the given preamble root sequence. The noise floor estimator is configured to compute the noise floor threshold as a product of: average energy of the received signal samples less total signal energy contained in each cyclic prefix window in which a preamble is detected using the given preamble root sequence; and a predetermined normalized relative noise floor threshold based on a target false preamble detection rate.

19 Claims, 5 Drawing Sheets

(51) Int. Cl.
  *H04L 27/26* (2006.01)
  *H04J 11/00* (2006.01)
  *H04W 52/24* (2009.01)
  *H04W 52/32* (2009.01)
  *H04W 52/50* (2009.01)
  *H04W 28/18* (2009.01)

(52) U.S. Cl.
  CPC ...... *H04L 27/2613* (2013.01); *H04L 27/2675* (2013.01); *H04W 28/18* (2013.01); *H04W 52/241* (2013.01); *H04W 52/243* (2013.01); *H04W 52/325* (2013.01); *H04W 52/50* (2013.01)

(56) References Cited

U.S. PATENT DOCUMENTS

| | | | | |
|---|---|---|---|---|
| 2004/0228283 | A1* | 11/2004 | Naguib | H04L 5/0044 370/252 |
| 2006/0227909 | A1* | 10/2006 | Thomas | H04B 1/7107 375/346 |
| 2008/0165903 | A1* | 7/2008 | Hooli | H04B 1/70753 375/343 |
| 2009/0040918 | A1* | 2/2009 | Jiang | H04B 1/59 370/210 |
| 2009/0213968 | A1* | 8/2009 | Tormalehto | H04W 74/0833 375/343 |
| 2011/0235529 | A1* | 9/2011 | Zetterberg | H04L 5/0053 370/248 |
| 2012/0127911 | A1* | 5/2012 | Nishikawa | H04B 7/024 370/312 |
| 2013/0084893 | A1* | 4/2013 | Saito | H04W 24/10 455/458 |

* cited by examiner

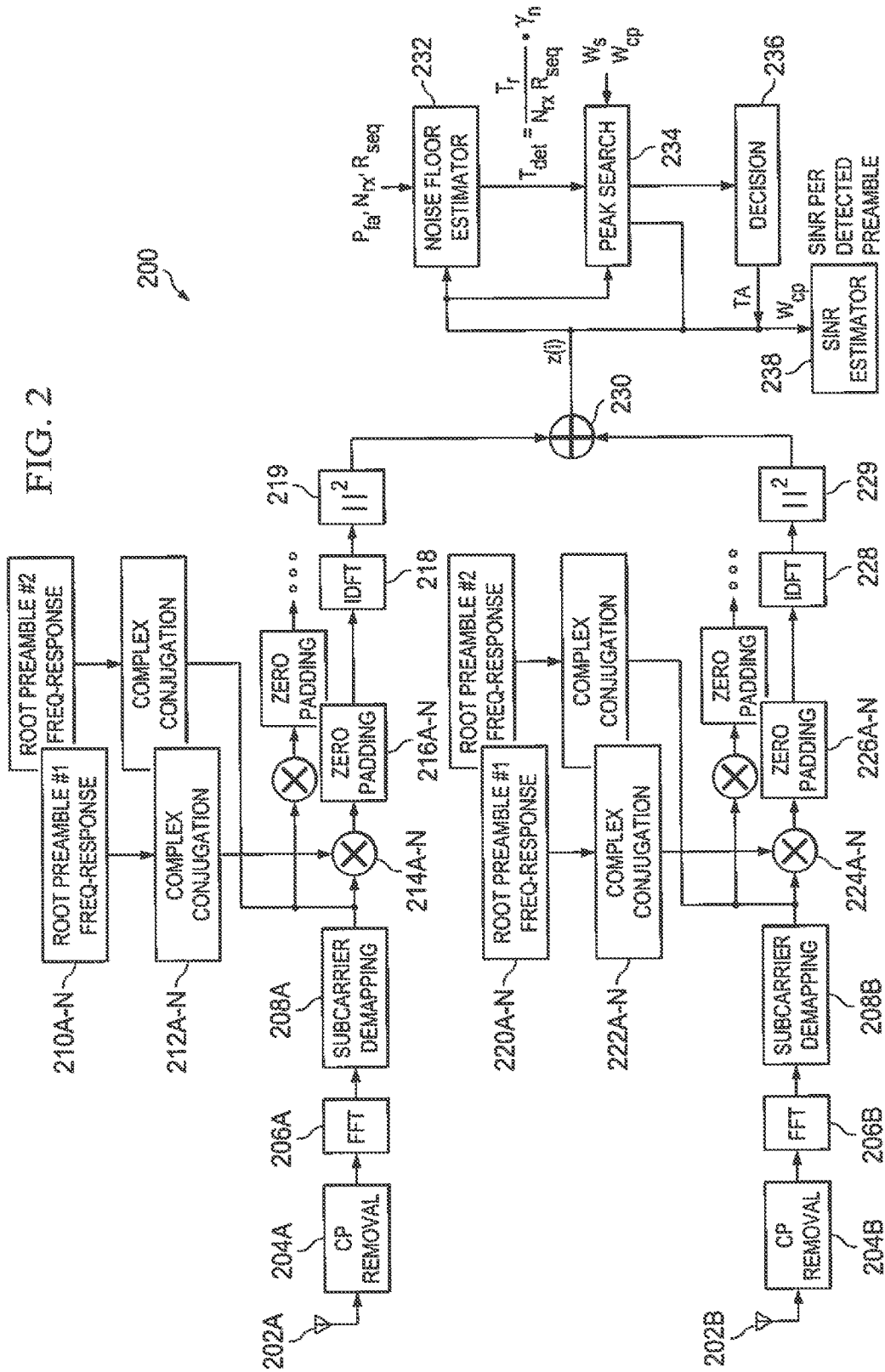

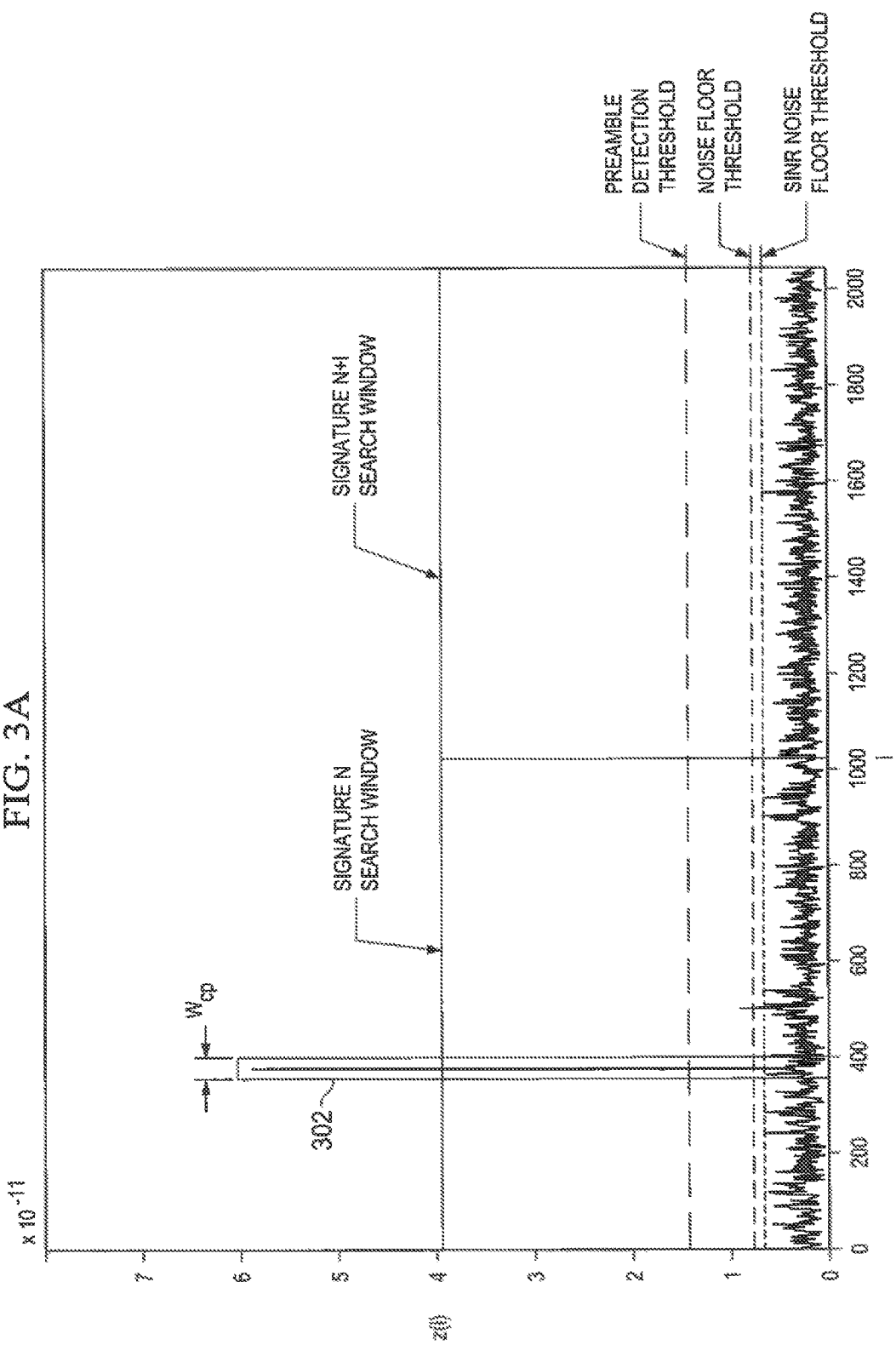

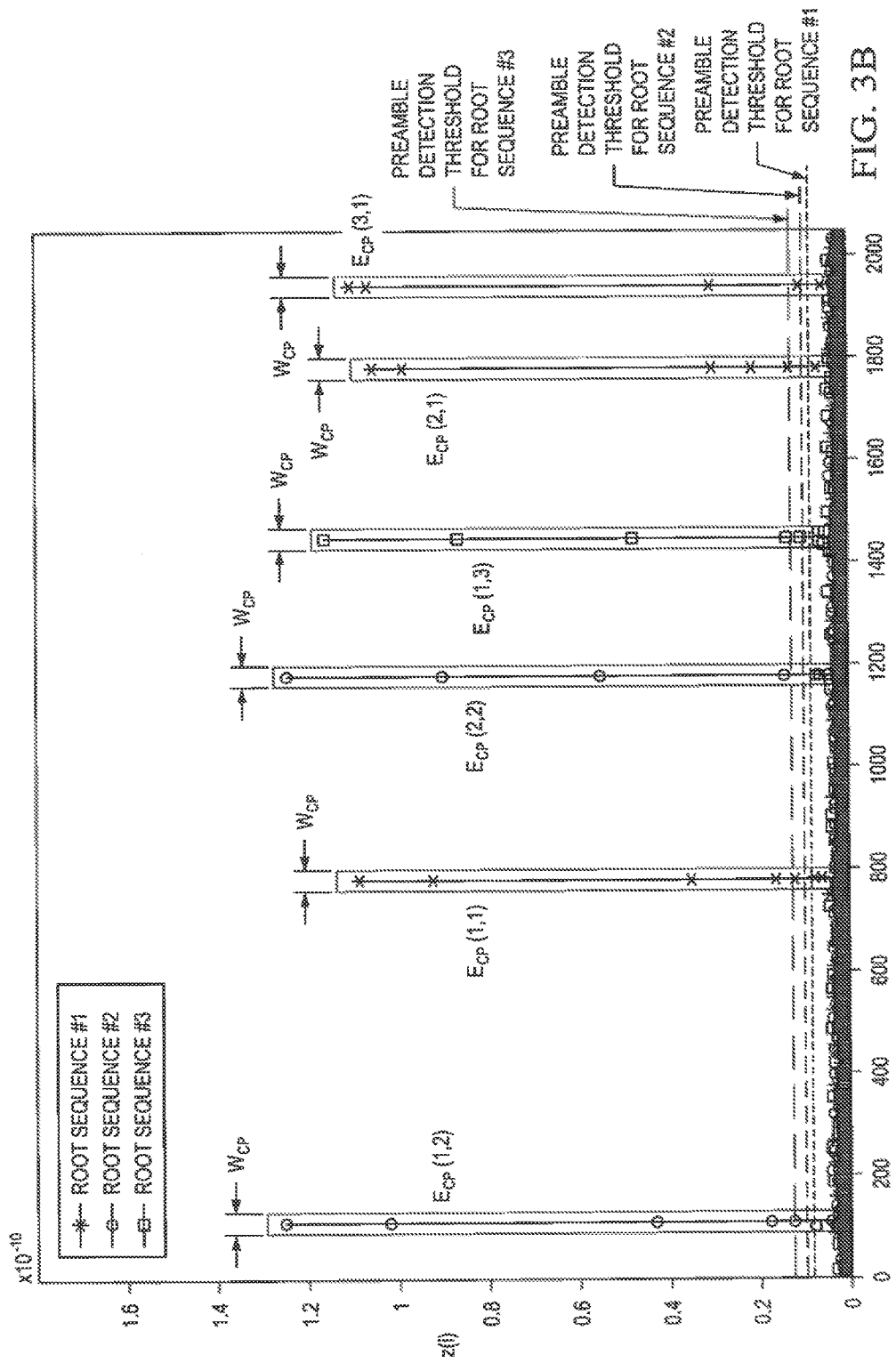

US 9,756,657 B2

WIRELESS NETWORK SIGNAL TO INTERFERENCE PLUS NOISE RATIO ESTIMATION FOR A RANDOM ACCESS CHANNEL

CROSS-REFERENCE TO RELATED APPLICATIONS

The present application claims priority to U.S. Provisional Patent Application No. 61/857,112, entitled "Signal to Interference and Noise Power Ratio Estimation in the Random Access of LTE Networks," filed Jul. 22, 2013; which is hereby incorporated by reference in its entirely.

BACKGROUND

In some wireless networks, long term evolution (LTE) networks being one example, user equipment (UE) obtains uplink synchronization by transmitting a preamble to a base station (or evolved Node B, eNB) via a physical random access channel (PRACH). The preambles used in the PRACH are constant-amplitude Zadoff-Chu (ZC) sequences of a prime length, such that the cyclic auto-correlation of the ZC sequence is an ideal delta function and the cyclic cross-correlation of two ZC sequences with different root sequence indices is a constant of magnitude $$\frac{1}{\sqrt{N_{ZC}}},$$

where $N_{ZC}$ is the ZC sequence length. At the base station, when a preamble is detected in the PRACH, its associated signal to interference plus noise ratio (SINR) can be estimated. The estimated preamble SINR can be used for the transmit power control (TPC) of the following first scheduled transmission on the uplink shared channel (ULSCH). As the preamble SINR estimate is primarily used for transmission on the ULSCH, the estimate should reflect the channel condition on the ULSCH even through the estimation is performed on the PRACH.

SUMMARY

An apparatus and method for determining noise floor and signal to interference plus noise ratio (SINR) for the physical random access channel (PRACH) of a wireless network are disclosed herein. In one embodiment, a wireless device includes a preamble detector configured to identify a plurality of preambles transmitted via a random access channel of a wireless network. The preamble detector includes a noise floor estimator. The noise floor estimator is configured to estimate, for a given preamble root sequence identified by the preamble detector, a noise floor value as mean energy of received signal samples, excluding detected preamble samples on the given preamble root sequence, below a noise floor threshold assigned to the given preamble root sequence. The noise floor estimator is configured to compute the noise floor threshold as a product of average energy of the received signal samples less total signal energy contained in each cyclic prefix window in which a preamble is detected using the given preamble root sequence, and a predetermined normalized relative noise floor threshold based on a target false preamble detection rate.

In another embodiment, a method includes receiving signals transmitted via a random access channel of a wireless network. Preambles are detected in the received signals. For a given preamble root sequence with any preamble detected, a noise floor value is estimated as mean energy of received signal samples, excluding detected preamble samples on the given preamble root sequence, below a noise floor threshold assigned to the given preamble root sequence. The noise floor threshold is computed as a product of: average energy of the received signal samples less total signal energy contained in each cyclic prefix window in which a preamble is detected using the given preamble root sequence, and a predetermined normalized relative noise floor threshold based on a target false preamble detection rate.

In a further embodiment, apparatus for implementing a wireless base station includes a preamble detector configured to identify a plurality of preambles transmitted via a random access channel of a wireless network. The preamble detector includes a noise floor estimator. The noise floor estimator is configured to estimate, for a given preamble root sequence identified by the preamble detector, a noise floor value as mean energy of received signal samples, excluding detected preamble samples on the given preamble root sequence, below a noise floor threshold assigned to the given preamble root sequence. The noise floor estimator is configured to compute the noise floor threshold as a product of average energy of the received signal samples less total signal energy contained in each cyclic prefix window in which a preamble is detected using the given preamble root sequence, and a predetermined normalized relative noise floor threshold based on a target false preamble detection rate. The noise floor estimator is configured to adjust the noise floor value for the given preamble root sequence based on interference energy of all preambles detected using a preamble root sequence other than the given preamble root sequence, for the purpose of SINR estimation for each detected preamble.

BRIEF DESCRIPTION OF THE DRAWINGS

For a detailed description of exemplary embodiments of the invention, reference will now be made to the accompanying drawings in which:

FIG. 2 shows a block diagram of a preamble detector for use in a base station of a wireless network in accordance with various embodiments;

FIG. 3a shows a diagram of received signal power samples for a root sequence in accordance with various embodiments;

FIG. 3b shows a diagram with three root sequences, each root sequence being associated with a separate preamble detector.

NOTATION AND NOMENCLATURE

Figure 1:
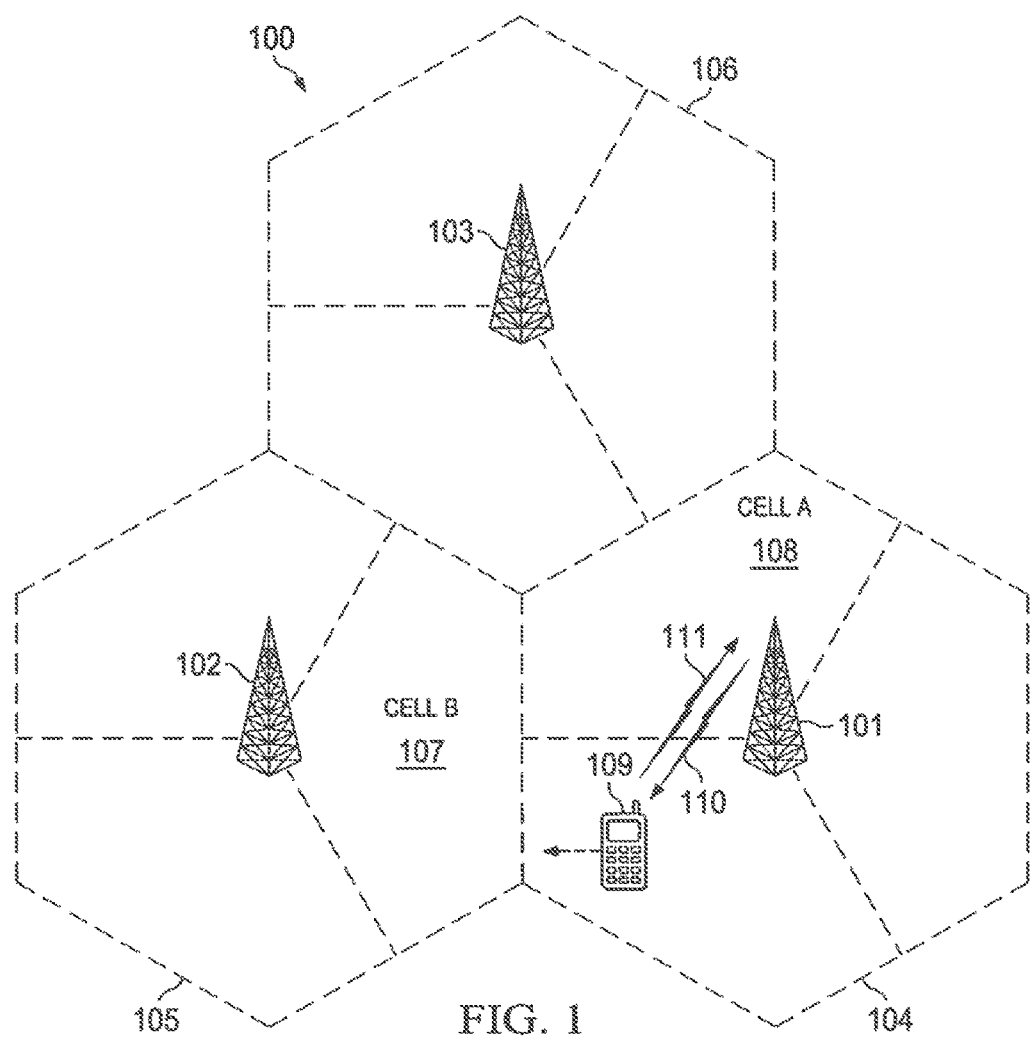
FIG. 1 shows a block diagram of a wireless network in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In conventional preamble detection methods, a noise floor estimate is used to compute a preamble detection threshold based on a target false preamble detection rate (i.e., target false alarm rate). Unfortunately, if multiple root sequences are configured at a base station, due to the constant cross correlation between different root sequences, the preambles received using a first root sequence contribute to the noise floor estimate of a different root sequence. That is, the noise floor estimate for a root sequence can include interference from the preambles received for different root sequences. In addition to this cross-correlation interference, when multiple preambles are received for a given root sequence, the noise floor estimate for the given root sequence also increases. This is due to the fact that the total received power for a root sequence is used to compute the noise floor estimate for preamble detection, which includes the power of all received preambles for the given root sequence.

Embodiments of the present disclosure provide an improved noise floor estimate for use in signal to interference plus noise ratio (SINR) determination. Embodiments generate the improved noise floor estimate by excluding preamble signal energy from the signal energy applied to compute the noise floor estimate. Applying the improved noise floor estimate, embodiments can compute an SINR value for use with the uplink shared channel (ULSCH) that is more accurate than that provided by conventional systems.

FIG. 1 shows a block diagram of a wireless network 100 in accordance with various embodiments. The illustrative wireless network includes base stations 101, 102 and 103, though in practice, embodiments of the network 100 may include any number of base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, e.g., traffic data, measurements reports, tracking area updates, etc., UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Various embodiments of the network 100 operate in compliance with the long term evolution (LTE) networking standards. Accordingly, UE 109 obtains uplink synchronization by transmitting a preamble to base station 101 via a physical random access channel (PRACH). The preamble includes Zadoff-Chu (ZC) sequences of prime length. Such sequences possess ideal periodic autocorrelation and optimum periodic cross-correlation. The preamble can be a root ZC sequence or a cyclic shifted version of a root ZC sequence.

The base stations 101, 102, 103 include preamble detectors that identify preambles transmitted by a UE, compute SINR for the PRACH and determine transmit power to be applied by the UE on the Uplink Shared Channel based on the SINR computed for the PRACH. The preamble detectors included in the base stations 101, 102, 103 provide PRACH noise and PRACH SINR values that are more accurate than those provided by convention base stations. Accordingly, the base stations 101, 102, 103 can determine the transmit power to be applied by the UE on the ULSCH more accurately than conventional base stations.

FIG. 2 shows a block diagram of a preamble detector 200, in accordance with various embodiments, for use in a base station of the wireless network 100. In preamble detector 200, radio frequency signal is received via antennas 202A, 202B. The received signals are digitized, and cyclic prefix (CP) removers 204a, 204b remove the cyclic prefixes from the received signals. After cyclic prefix removal, the signals are converted to frequency domain by frequency domain transformers 206a, 206b. A discrete Fourier transform of size either the entire preamble length or its constituent sequence length may be performed depending on whether coherent or non-coherent accumulation is used. Subcarrier demappers 208a, 208b extract the subcarriers used by preambles in the frequency domain. In the frequency domain embodiments, one preamble detector can be used to detect all signatures based on one root preamble sequence.

The received signal is correlated with all available root preamble sequences to detect UE preamble transmissions. Each available root preamble sequence includes a corresponding root preamble frequency response 210A-210N, 220A-220N. Complex conjugators 212A-212N, 222A-222N compute complex conjugates of the root preamble frequency responses 210A-210N, 220A-220N, and multipliers 214A-214N, 224A-224N multiply subcarrier by subcarrier the demapped subcarriers with the complex conjugates of the root preamble sequences to perform the correlation.

PRACH preamble detection in the preamble detector 200 uses power sample based processing that compares each power sample with a preamble detection threshold. The base station declares corresponding detected signatures and estimates associated UE delays for any power samples exceeding the detection threshold. Embodiments of the preamble detector 200 generalize sample-based preamble detection using a sliding window of data of CP duration. Instead of each power sample, the received preamble energy within the sliding window is compared with a preamble detection threshold defined as:

$$T_{det} = \frac{T_r}{N_{rx}R_{seq}}\gamma_n$$

where:

$T_{det}$ is the absolute preamble detection threshold;

$$\frac{T_r}{N_{rx}R_{seq}}$$

is the predetermined relative preamble detection threshold based on a predefined false alarm probability when no preamble is transmitted;

$N_{rx}$ is the number of receive antennas;

$R_{seq}$ is the number of sequence repetitions; and $\gamma_n$ is the noise floor estimate.

The sample based approach can be viewed as a special case of the sliding window based approach with a sliding window of one sample. In embodiments disclosed herein, the window can be the result of a windowing filter such as a unit impulse window filter, a rectangular window filter, a triangular window filter, a Hamming window filter, a Hann window filter, a cosine window filter, a Lanczos window filter, a Bartlett window filter, a Gauss window filter, a Bartlett-Hann window filter, a Blackman window filter, a Kaiser window filter, etc. Filter taps of the window filter may be computed adaptively.

The preamble detector 200 up-samples the preamble by zero padding the correlations, at zero padders 216A-216N, 226A-226N, in the frequency domain such that signal length is a power of 2. The inverse frequency transformers 218, 228 convert the frequency domain signals to time domain signals. Signal power converters 219, 229, compute the square of the absolute value of the time-domain signal, summer 230 sums the resultant power signals.

The noise floor estimator 232, peak searcher 234, and SINR estimator 338 operate on time domain signals. The preamble detection threshold $T_{det}$ is derived assuming a predefined false alarm probability when no preamble is transmitted. With sliding window based preamble detection, the preamble detection threshold is a straightforward extension of the single sample case with a sliding window length $W_{CP}$ of $W_{CP}$>L samples, where L is the preamble upsampling ratio.

The noise floor estimator 232 may generate two different noise floor estimates based on the time domain power samples provided by the summer 230. A first noise floor estimate $\gamma_n$ is generated for use in preamble detection, and a second noise floor estimate $\hat{\gamma}_n$, that is different from $\gamma_n$, is generated for use in SINR computation after preamble detection. For computation of noise floor $\gamma_n$, the noise floor estimator computes a noise floor threshold as:

$$T_n = \frac{F_Z^{-1}(1-P_{fa})}{N_{rx}R_{seq}} \cdot \frac{1}{N_{IDFT}} \sum_{i=1}^{N_{IDFT}} z(i)$$

where $P_{fa}$ is a predefined PRACH false alarm rate;

$N_{IDFT}$ is the size of the inverse transform performed at the transformers 218, 228;

$z(i)$ are power samples generated by summer 230; and $$F_Z(z) = 1 - e^{-z} \sum_{k=0}^{N_{rx}R_{seq}-1} \frac{1}{k!}z^k$$

is the cumulative distribution function (CDF) for central chi-square distribution with additive white Gaussian noise input. The quantity $$\frac{F_Z^{-1}(1-P_{fa})}{N_{rx}R_{seq}}$$

is the predetermined normalized relative noise floor threshold based on a predefined false alarm rate.

Applying the noise floor threshold $T_n$, the noise floor estimator computes the noise floor $\gamma_n$ as average power below the noise floor threshold $T_n$:

$$\gamma_n = \frac{1}{N_s} \sum_{\substack{i=1, \\ z(i)<T_n}}^{N_{IDFT}} z(i)$$

where:

$N_s$ is the number of samples $Z(i)$ summed. Note that the noise floor $\gamma_n$ may be normalized by dividing it with a scaling factor $N_{rx}R_{seq}$, where $N_{rx}$ is the number of receive antennas and $R_{seq}$ is the number of sequence repetitions.

The preamble detector 200 may include a combination of dedicated circuitry and a processor executing instructions to provide the functionality disclosed herein. For example, CP removers 204a, 204b, frequency domain transformers 206a, 206b, and subcarrier demappers 208a, 208b may be implemented by dedicated hardware circuitry. Functionality downstream of the subcarrier demappers 208a, 208b may be implemented via a processor (e.g., a digital signal processor) executing instructions, retrieved from a storage device by the processor, that when executed cause the processor to perform the operations disclosed herein. The noise floor estimator 232, SINR estimator 238, etc. may implemented by the processor executing instructions stored in a computer-readable medium, such as a memory.

Unfortunately, because multiple root sequences are configured at the preamble detector 200, due to the constant cross correlation between different root sequences, the preambles received at one root sequence contribute to the noise floor estimate $\gamma_n$ at another root sequence. That is, the noise floor estimate $\gamma_n$ for a root sequence can include interference from the preambles received at a different root sequence. In addition to this cross-correlation interference, when multiple preambles are received at a given root sequence, the noise floor estimate at the given root sequence also increases due to the increase in total received power of the multiple preambles. The increased noise floor detrimentally impacts SINR.

To alleviate the impact of preamble energy on noise floor and SINR computation, the noise floor estimator 232 computes the second noise floor estimate $\hat{\gamma}_n$ after preamble detection. Noise floor estimate $\hat{\gamma}_n$ excludes preamble signal energy from the noise floor computation, thereby providing a more accurate noise floor value and ultimately a more accurate SINR value, Note that the noise second noise floor estimate $\hat{\gamma}_n$ may be normalized by dividing it with a scaling factor $N_{rx}R_{seq}$, where $N_{rx}$ is the number of receive antennas and $R_{seq}$ is the number of sequence repetitions.

FIG. 3 shows a diagram of signal power samples generated for a root sequence by the summer 230 in accordance with various embodiments. In FIG. 3, two preamble search windows corresponding to two preambles using two cyclic shifts of one ZC root sequence are shown as a matter of convenience. In practice, the preamble detector 200 may apply any number of preamble search windows contingent on specific cell configuration. A preamble detection threshold computed as described herein is shown, and illustrative noise floor threshold values applied to compute $\gamma_n$ and $\hat{\gamma}_n$ are shown. In FIG. 3, a single preamble exceeding the preamble detection threshold is shown in window 302. Window 302 is a sliding preamble detection window of length $W_{CP}$ (i.e., cyclic prefix length).

For each preamble identified by the preamble detector 200, the noise floor estimator 232 computes the total sample power $E_{CP}$ within the window $W_{CP}$ containing the detected preamble. The window may start at a position at which maximum total power is contained within the window, or the window may start at the maximum detected sample position, depending on the employed preamble detection method. Sample power $E_{CP}$ for each identified preamble is excluded from the sample power of a root sequence applied to compute the noise floor $\hat{\gamma}_n$. For a given root sequence, the noise floor estimator 232 excludes the total preamble power $E_{CP}$ for preambles detected for the given root sequence, and excludes cross-correlation interference power derived from $E_{CP}$ for preambles detected for other root sequences.

FIG. 3b shows that there are 3 root sequences used in this example. Each mot sequence is associated with a separate preamble detector. The preambles on each root sequences are detected by its associated root sequence detector based on its corresponding preamble detection threshold (horizontal lines in different colors for different root sequences). There are a total of 6 preambles detected on the 3 root sequences, with 3 preambles detected on the root sequence #1, 2 on the root sequence #2, and 1 on the root sequence #3.

In the description below, the term "energy" and "power" are used in an interchangeable way when the context shows that they have the same physical meaning. In this application, a second noise floor estimate and a total cross-correlation interference power are described. The total cross-correlation interference power is used as the adjustment value for the second noise floor estimate. The SINK of the k-th detected preamble at the j-th root sequence detector can be estimated by using the following equation, $$SINR(k, j) = \max\left(0, \frac{E_{cp}(k, j) - W_{cp}\sum_{i \ne j} I_{CC}(i)}{N_{comb}R_{seq}N_{rx}\hat{\gamma}_n(j)} - W_{cp}\right) \times \frac{N_{comb}}{\alpha N_{seq}} \quad (1)$$

where $E_{cp}(k,j)$ is the received energy within the window $W_{cp}$ for the k-th detected preamble on the j-th root sequence, $W_{cp}$ is the cyclic prefix (CP) length of uplink data transmission on uplink shared channel, $\sum_{i \ne j} I_{cc}(i)$ is the total cross-correlation interference power received at the j-th sequence detector from the preambles detected at all the other root sequence detectors and is computed in block 412, $\hat{\gamma}_n(j)$ is the adjusted second noise floor estimate at the j-th root sequence detector, and is computed in block 414, $N_{seq}$ is the ZC sequence length, and $\alpha$ is the up-sampling ratio in time domain. The notation $N_{comb}$ is the number of cyclic-shift combinings which is set to 1 for normal cell and to 3 for high-speed cell, $R_{seq}$ is the number of sequence repetitions and $N_{rx}$ is the number of receive antennas.

Figure 4:
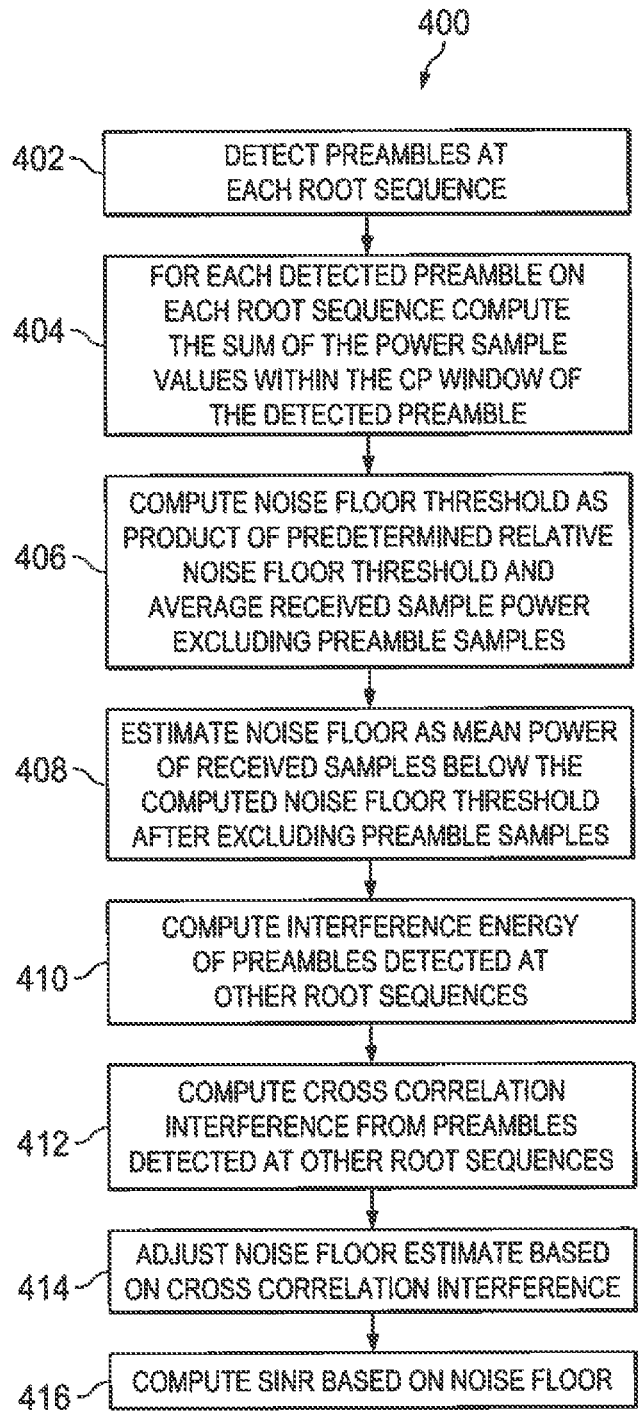
FIG. 4 shows a flow diagram for a method for determining signal to noise and interference ratio (SINR) in a wireless device in accordance with various embodiments.

FIG. 4 shows a flow diagram for a method 400 for determining noise floor and SINK in the preamble detector 200 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 400 may be performed by a processor executing instructions retrieved from a non-transitory computer readable storage medium.

In block 402, the preamble detector 200 is operating as a component of a base station (e.g., base station 101 in the network 100. The preamble detector 200 is receiving wireless signals transmitted by user equipment, and detecting preambles transmitted by the user equipment at each of a plurality of root sequences.

In block 404, for each k-th preamble detected at each j-th root sequence, the noise floor estimator 232 computes the power $E_{CP}(k,j)$ by summing the power samples within its CP window $W_{CP}$.

In block 406, the noise floor estimator 232 computes a second noise floor threshold for each root sequence as a product of: 1) a predetermined normalized relative noise floor threshold that is based on a target false preamble detection rate, and 2) average received sample power for the root sequence which excludes the power samples in CP windows for all the preambles detected at the root sequence.

In block 408, at each j-th root sequence, the noise floor estimator 232 computes the associated second noise floor estimate $\hat{\gamma}_n(j)$ as the arithmetic mean of power samples on the root sequence with power sample magnitude below its associated second noise floor threshold, while excluding the power samples in CP windows for all the preambles detected at the root sequence.

In block 410, the noise floor estimator 232 computes the total interference energy of the preambles which are detected at each other root sequence. For each k-preamble detected at each j-th root sequence, the noise floor estimator 232 computes an energy value $E_{cp}(k,j)$ less the noise energy within the window $W_{cp}$ corresponding to this preamble detected.

In block 412, the noise floor estimator 232, for each root sequence, computes cross-correlation interference power for each other root sequence. The noise floor estimator 232 computes the cross correlation interference power for a root sequence by dividing the total interference energy for the root sequence by the number of power samples for the root sequence.

In block 414, for each root sequence j, the noise floor estimator 232 adjusts the second noise floor estimate $\hat{\gamma}_n(j)$ computed in block 408 by subtracting from it the total cross-cross-correlation interference energy computed in block 412 at the root sequence.

In block 416, for each detected preamble, the SINR estimator 238 computes an SINR estimate. The SINR estimate is computed by using the equation in (1) and the adjusted second noise floor estimate $\tilde{\gamma}_n$ is computed in the block 414.

The above discussion is meant to be illustrative of the principles and various embodiments of the present invention, Numerous variations and modifications will become apparent to those skilled in the art once the above disclosure is fully appreciated. It is intended that the following claims be interpreted to embrace all such variations and modifications.

What is claimed is:

1. A wireless device, comprising:
 an antenna for receiving a wireless transmission;
 preamble detector circuitry configured to identify within the received wireless transmission a plurality of preambles transmitted via a random access channel of a wireless network, the preamble detector circuitry comprising:
 noise floor estimator circuitry configured to:
  estimate, for a given preamble root sequence identified b the preamble detector circuitry, a noise floor value as mean energy of received signal samples, excluding detected preamble samples within each cyclic prefix window on the given preamble root sequence, below a noise floor threshold assigned to the given preamble root sequence; and
  compute the noise floor threshold as a product of:
   average energy of the received signal samples less total signal energy contained in each cyclic prefix window in which a preamble is detected using the given preamble root sequence; and
   a predetermined normalized relative noise floor threshold based on a target false preamble detection rate.

2. The wireless device of claim 1, wherein a cyclic prefix window length is equal to that of uplink data transmission on uplink shared channel.

3. The wireless device of claim 1, further comprising a signal to interference-plus-noise ratio (SINR) estimator circuitry configured to determine SINR for a preamble detected by the preamble detector circuitry, the SINR determined based on the noise floor value estimated by the noise floor estimator circuitry, wherein the noise floor value excludes all preamble signal energy.

4. A wireless device, comprising:
 an antenna for receiving a wireless transmission;
 preamble detector circuitry configured to identify within the received wireless transmission a plurality of preambles transmitted via a random access channel of a wireless network, the preamble detector circuitry comprising:
 noise floor estimator circuitry configured to:
  estimate, for a given preamble root sequence identified by the preamble detector circuitry, a noise floor value as mean energy of received signal samples, excluding detected preamble samples within each cyclic prefix window on the given preamble root sequence, below a noise floor threshold assigned to the given preamble root sequence;
  compute the noise floor threshold as a product of:
   average energy of the received signal samples less total signal energy contained in each cyclic prefix window in which a preamble is detected using the given preamble root sequence; and
   a predetermined normalized relative noise floor threshold based on a target false preamble detection rate;
  determine total interference energy of all preambles detected using a preamble root sequence other than the given preamble root sequence; and
  adjust the noise floor value for the given preamble root sequence based on the total interference energy.

5. The wireless device of claim 4, wherein the noise floor estimator circuitry is configured to determine the total interference energy as a sum of signal energy contained in a cyclic prefix window in which a preamble is detected using a preamble root sequence other than the given preamble root sequence less noise energy contained within the cyclic prefix window in which a preamble is detected using a preamble root sequence other than the given preamble root sequence.

6. The wireless device of claim 4, wherein the noise floor estimator circuitry is configured to determine total cross-correlation interference energy as a ratio of the total interference energy to a number of power samples for each preamble root sequence.

7. The wireless device of claim 6, wherein the noise floor estimator circuitry is configured to adjust the noise floor value for the given preamble root sequence by excluding from the noise floor value the total cross-correlation interference energy.

8. A method, comprising:
 receiving signals transmitted via a random access channel of a wireless network;
 detecting preambles in the received signals;
 estimating, for a given preamble root sequence identified by the detecting, a noise floor value as mean energy of received signal samples, excluding detected preamble samples within each cyclic prefix window on the given preamble root sequence, below a noise floor threshold assigned to the given preamble root sequence;
 computing the noise floor threshold as a product of:
  average energy of the received signal samples less total signal energy contained in each cyclic prefix window in which a preamble is detected using the given preamble root sequence; and
  a predetermined normalized relative noise floor threshold based on a target false preamble detection rate.

9. The method of claim 8, further comprising estimating a signal to interference-plus-noise ratio (SINR) for the detected preambles, the SINR calculated based on the noise floor value, wherein the noise floor value excludes all preamble signal energy.

10. The method of claim 9, further comprising applying the SINR in a transmission to a wireless device that transmitted the detected preambles.

11. The method of claim 8, wherein a cyclic prefix window length is equal to that of uplink data transmission on uplink shared channel.

12. A method, comprising:
 receiving signals transmitted via a random access channel of a wireless network;
 detecting preambles in the received signals;
 estimating, for a given preamble root sequence identified by the detecting, a noise floor value as mean energy of received signal samples, excluding detected preamble samples within each cyclic prefix window on the given preamble root sequence, below a noise floor threshold assigned to the given preamble root sequence;
 computing the noise floor threshold as a product of:
  average energy of the received signal samples less total signal energy contained in each cyclic prefix window in which a preamble is detected using the given preamble root sequence; and
a predetermined normalized relative noise floor threshold based on a target false preamble detection rate;
determining total interference energy of all preambles detected using a preamble root sequence other than the given preamble root sequence; and
adjusting the noise floor value for the given preamble root sequence based on the total interference energy.

13. The method of claim 12, further comprising determining the total interference energy as a sum of signal energy contained in a cyclic prefix window in which a preamble is detected using a preamble root sequence other than the given preamble root sequence less noise energy contained within the cyclic prefix window in which a preamble is detected using a preamble root sequence other than the given preamble root sequence.

14. The method of claim 12, further comprising determining total cross-correlation interference energy as a ratio of the total interference energy to a number of power samples for each preamble root sequence.

15. The method of claim 14, further comprising adjusting the noise floor value for the given preamble root sequence by excluding from the noise floor value the total cross-correlation interference energy.

16. Apparatus for implementing a wireless base station, comprising:
an antenna for receiving a wireless transmission;
preamble detector circuitry configured to identify within the received wireless transmission a plurality of preambles transmitted via a random access channel of a wireless network, the preamble detector circuitry comprising:
noise floor estimator circuitry configured to:
estimate, for a given preamble root sequence identified by the preamble detector circuitry, a noise floor value as mean energy of received signal samples, excluding detected preamble samples within each cyclic prefix window on the given preamble root sequence, below a noise floor threshold assigned to the given preamble root sequence;
compute the noise floor threshold as a product of:
average energy of the received signal samples less total signal energy contained in each cyclic prefix window in which a preamble is detected using the given preamble root sequence; and
a predetermined normalized relative noise floor threshold based on a target false preamble detection rate; and
adjust the noise floor value for the given preamble root sequence based on total interference energy of all preambles detected using a preamble root sequence other than the given preamble root sequence.

17. The apparatus of claim 16, wherein the noise floor estimator circuitry is configured to determine the total interference energy as a sum of signal energy contained in a cyclic prefix window in which a preamble is detected using a preamble root sequence other than the given preamble root sequence less noise energy contained within the cyclic prefix window in which a preamble is detected using a preamble root sequence other than the given preamble root sequence.

18. The apparatus of claim 17, wherein the noise floor estimator circuitry is configured to:
determine total cross-correlation interference energy as a ratio of the total interference energy to a number of power samples for each preamble root sequence; and
adjust the noise floor value for the given preamble root sequence by excluding from the noise floor value the total cross-correlation interference energy.

19. The apparatus of claim 16, further comprising a signal to interference-plus-noise ratio (SINR) estimator circuitry configured to determine SINR for a preamble detected by the preamble detector circuitry, the SINR determined based on the noise floor value estimated by the noise floor estimator circuitry, wherein the noise floor value excludes preamble signal energy.

* * * * *